Jan. 6, 1970        G. A. SHIFRIN        3,487,685
ABSORPTION RADIOMETER
Filed Nov. 1, 1966
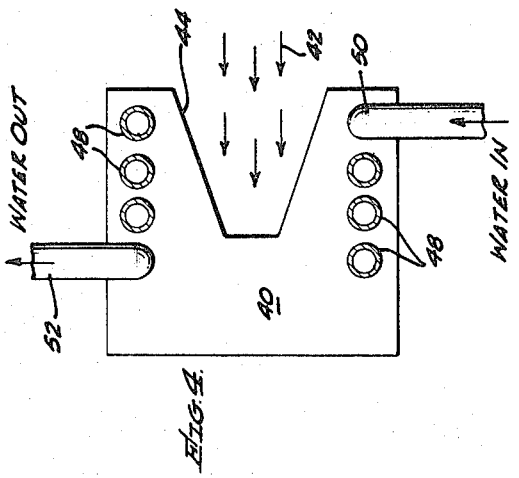
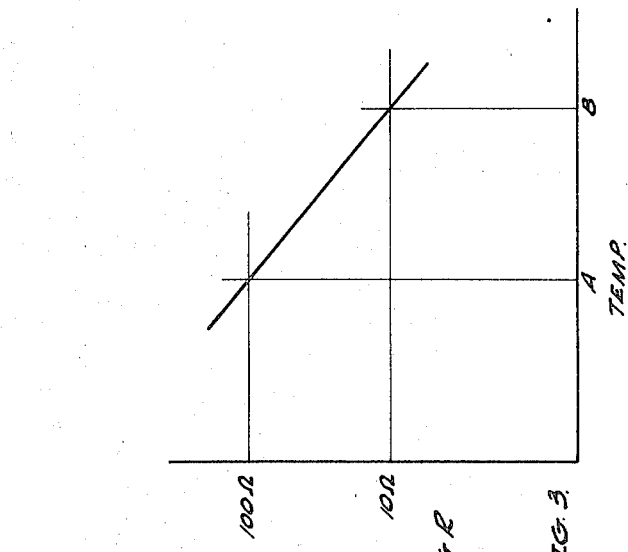
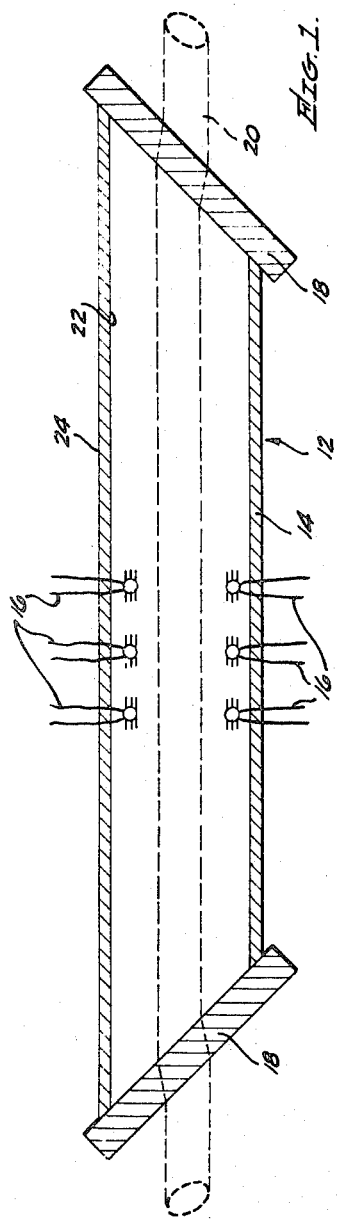
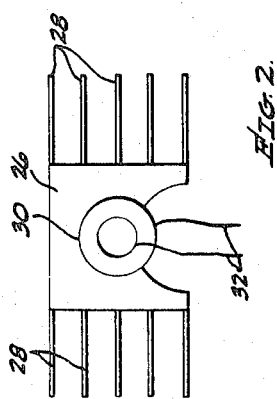
INVENTOR.
GORDON A. SHIFRIN,
BY
ATTORNEY.

United States Patent Office 3,487,685
Patented Jan. 6, 1970

3,487,685
ABSORPTION RADIOMETER
Gordon A. Shifrin, Malibu, Calif., assignor to Hughes Aircraft Company, Culver City, Calif., a corporation of Delaware
Filed Nov. 1, 1966, Ser. No. 591,177
Int. Cl. G01k 17/00
U.S. Cl. 73—190    9 Claims

ABSTRACT OF THE DISCLOSURE

A closed chamber is provided of generally elongated form having an internal diameter greater than the diameter of a radiated beam being monitored. Chamber is provided with optically transparent elements at opposed ends thereof to admit the beam for transmission through the chamber. Preferably the transparent elements are at the Brewster angle in relation to the line of beam propagation. The chamber is filled with an appropriate gas, the gas having the capacity to weakly absorb beam energy within the range of the beam spectral band. The balance of the beam is transmitted through the chamber. Heating of the gas particles within the chamber by beam passage is monitored by an appropriate device, the heating being proportional to total beam energy. Thus, a continuously operating beam such as a laser may be continuously monitored to determine if the beam energy is at the correct level.

---

The invention is directed to an absorption radiometer adapted to provide continuous power monitoring of relatively high power beams of continuous radiation. Currently, it has particular utility in, though not limited to, radiation beams which are essentially monochhromatic such as those generated by gas lasers.

The continuous monitoring of high power levels of continuous radiation beams is a difficult practical problem. It has been the prior art practice to measure the power level of a given beam by total absorption thereof, as will hereinafter be described, and thereafter remove the measuring device and focus the now measured beam at the work area. This, of course, gives an absolute value of the power measured. An obvious disadvantage is the fact that the total beam power is used in measurement and useful work therefrom during that phase is lost. A further practical problem existed in that it was difficult to know that the beam continued at its indicated power output after measurement. These and other techniques are generally known as absolute power measurements.

Currently, this problem appears in the applications using continuous infrared gas lasers, though it will be understood that the invention herein disclosed may be adapted to many high power continuous radiation sources.

Other techniques to monitor radiated power are generally known as relative measurement. For example, a small portion of this power being radiated is captured and directed to a conventional thermal detector such as a thermopile or the like. The invention here disclosed is directed to a novel mode of relative measurement.

It is therefore a primary object of the invention to provide a radiometer to continuously monitor the level of high power beams of radiant energy.

It is a further object of the invention to provide continuous power monitoring devices of the type described without substantially impairing energy delivery to the work area.

It is a specific object of the invention to provide a monitoring radiometer of the type described having specific utility in monitoring high radiated power levels from continuous infrared gas lasers.

It is yet a further specific object of the invention to utilize the absorptive capacity of particular gases within specific spectral radiation bands to absorb a small portion of the radiated beam without diminishing importantly the power of the beam being transmitted therethrough to a work area or the like.

Yet another specific object of the invention is to provide power monitoring of the type described that will offer highly accurate power level determination, minimizing absorbed beam power loss, and thus provide high efficiency from the standpoint of the transmitted beam and the measured power level.

Specially, the invention may be structurally embodied by providing a closed chamber, preferably of elongated form, having an internal diameter greater than the diameter of the radiated beam being monitored. The chamber is provided with optically transparent elements at opposed ends thereof to admit of beam transmission. In a preferred embodiment of the invention the optically transparent elements are positioned at the Brewster angle with relation to the line of beam propagation, thus virtually eliminating any beam power loss due to reflection at the elements. Internally, the chamber is filled with an appropriate gas, the gas having the capacity to absorb beam energy within the range of the beam spectral band. In a preferred embodiment the gas, either singly or by mixture composition, is chosen so that it will only weakly absorb the beam at the desired wavelength. That is, the gas is partially absorbent yet greatly transmissive to the particular beam or beams. Nevertheless, some of the gas particles will sustain energy excitations, i.e., the gas will be heated in direct proportion to the power level of the beam being transmitted. To minimize dissipative loss of absorbed beam power, it is desirable that the internal aspects of the chamber itself or a surrounding enclosure be constructed to approach a true blackbody absorber, that is, be coated with a material, such as graphite, which approaches perfect absorption and perfect emissivity of electromagnetic waves. Thus, the heat power converted by beam absorption will accurately reflect itself in the gas temperature rise after equilibrium conditions have been achieved and may be measured by an appropriate transducer within the chamber.

To further minimize heat loss from the chamber and to reduce the effect of scattered radiant energy from other sources, the outer aspects of the chamber or surrounding enclosure may be highly polished to provide a good radiation reflecting surface.

To measure power absorbed, a transducer, for example, a thermistor or an array of thermistors, may be positioned within the chamber. The transducer is heated by the convective action of the gas therein as a result of the latter beam absorbed energy. The transducer may be coupled to a conventional calibrated indicating device, or the like, which responds to the variation in transducer condition, and accurately reflects incident beam power.

These and other objects of the invention, as well as other features thereof, will become apparent in the course of the following description and from an examination of the related drawings wherein:

FIGURE 1 is a side-elevational view, partly in section, of a preferred absorption radiometer;

FIG. 2 is a fragmentary side-elevational view of a typical thermal detector that may be used in the arrangement;

FIG. 3 is a graph illustrating the sensitivity of one detector device that may be utilized in the invention; and FIG. 4 is a partially schematic view of a device that may be used to calibrate the structure of the instant invention.

It is well known that at wavelengths between 8 microns and 14 microns air is highly transmissive and it is in this range at approximately 10.6 microns that currently available carbon dioxide lasers are frequently used. The carbon dioxide laser, therefore, is highly transmissive in air and is effective to transmit energy with a minimum energy loss over extremely long ranges. Those familiar with this field will understand that such lasers have been broadly adapted for use in many practical applications, such as communications, machining, welding, hole drilling, surface etching of workpieces and the like.

Directing attention to FIG. 1, it will be seen that an absorption radiometer is indicated generally at 12 and comprises an elongated cylinder 14 having deposited therein a plurality of thermal detectors 16, 16. The opposed ends of the cylinder 14 are beveled with respect to the long axis of the cylinder and are provided with closing windows 18, 18. The windows 18 may be of a variety of materials depending upon the wavelength of the laser beam being transmitted through the radiometer 12. For illustrative purposes the laser beam is indicated by dotted lines 20. Where the laser beam is created by a $CO_2$ laser in the 10.6 micron range, the windows 18 may comprise sodium chloride (NaCl) crystals. Such crystals, though others may be used, are highly transmissive at this wavelength. Where beams of different wavelengths are used, other window materials should be employed; again, the criteria applied is transmissivity at the wavelength of interest.

Cylinder 14 is evacuated and filled with an appropriate gas having the ability to absorb energy at the wavelength of the radiant energy beam being maintained. The cylinder 14 is diametrically sized so that the laser beam 20 is transmitted axially therethrough and the thermal detectors 16, 16, are positioned within the gas but outside of the direct path of the laser beam 20. Since it is desired that only a small portion of the laser beam energy being transmitted be utilized, that is, absorbed, to effect a beam power level determination, it is desirable that the gas within the cylinder 14 be weakly absorbent. Thus, only a small portion of the beam power will be absorbed to create heat. The major segment of beam power will be transmitted through the device. The mode of achieving this result will hereinafter be more fully explained.

To improve accuracy and provide maximum efficiency, the internal surface 22 of the cylinder 14 may be blackened with graphite or the like to provide a blackbody effect. Physical separation of this surface 22 from the gas itself may be advisable to prevent chemical contamination depending upon the gas used. A mode of achieving this result, as earlier suggested, is to physically surround cylinder 14 with a second blackbody cylinder (not shown) and eliminate the graphite from surface 22. The external surface 24 of the cylinder 14 is preferably highly polished so that it is reflective, and scattered incident radiation will not affect the internal thermal content of the cylinder 14.

The gas composition within the cylinder 14 may take several forms to avoid excessive beam power absorption in the device. For example, the gas used may be weakly absorbent to the radiation beam being propagated. In this instance, the weakly absorbing gas in cylinder 14 may be the only one used, i.e., the entire content is homogeneous. It may also be placed within cylinder 14 at a relatively high pressure, i.e., at atmospheric pressure and obtain the advantages of reduced thickness of window 18. Alternately, a strongly absorbing gas may be placed in cylinder 14 and diluted with a beam transparent gas, again at relatively high pressure, i.e., atmospheric. In this instance, weak beam power absorption is achieved because of the small portion by volume of the absorbing gas.

Persons familiar with the technical aspects of the invention will understand that the absorption wavelengths of the selected gas must be matched with the transmission wavelengths of the beam being monitored. For example, a carbon dioxide laser in its high power mode, radiates a considerable number of closely related but nevertheless different wavelengths of varying width and intensity. Various gases also absorb radiation in different degrees and at related but different wavelengths of varying width and intensity. Therefore, the absorbing gas selected must have wavelength absorption characteristics which closely match the transmitted wavelength of the beam being monitored.

Specifically referring to the carbon dioxide laser as an example, strong wavelength beam propagations have been observed in a range of 10.57 to 10.63 microns. Illustrating, anhydrous ammonia ($NH_3$) exhibits absorption characteristics close to the 10.57 to 10.63 micron range but not well matched therewith. Hence, anhydrous ammonia would be weakly absorbent to a laser beam in this range and highly transparent thereto. Accordingly, anhydrous ammonia is an example of a homogeneous gas that may be used in cylinder 14 and at a relatively high pressure.

Alternately, 1,1-difluoroethane gas exhibits a high absorption characteristic at about 10.59 microns. This would be a strongly absorbing gas for the $CO_2$ laser referred to above which could be diluted with a beam transparent gas and placed in cylinder 14. Helium is an excellent beam transparent gas which could be used in this example, and further possesses the desired characteristic of high thermal conductivity. Thus, a mixture of helium and 1,1-difluoroethane could be used in cylinder 14 at relatively high pressure and achieve the invention objectives of minor beam power absorption for monitoring purposes, thin windows 18 and good thermal convective conductivity for rapid device response.

FIGURE 2 is illustrative of a typical thermal detector which may be used in the structure. For example, it may comprise a central thermally conductive metallic plate 26 having a plurality of extending fins or wires 28, 28, to facilitate convective heat transfer. Centrally of the plate 26 a semiconductor thermistor 30 physically contacts the plate and is provided with appropriate electrical leads 32, 32, in the conventional sense.

It is well known that a typical conventional thermistor 30 functions so that its resistance varies markedly with minor changes in temperature. For example, the graph of FIG. 3 is typical in that the log of the resistance (the ordinate) drops sharply as temperature increases (the abscissa). For example, a thermistor having a resistance of 1000 ohms at temperature level A will drop to 100 ohms at temperature level B where the differential between A and B may represent 100° C.

In the operation of the structure of FIG. 1, the laser beam is transmitted through the absorption radiometer 12 and as a result of the presence of an absorbing gas at its wavelength therein, the gas is heated to a level directly proportional to the beam power being transmitted therethrough. The heated gas is moved by convection to the detector 16, raising the temperature thereof, and providing a thermistor output, e.g., a resistance variation which may be directly calibrated to the power of the transmitted beam 20. Thus, the beam 20 and particularly the power level thereof, may be continuously monitored.

The invention has other features in that providing a composite of absorbing gas and non-absorbing transmissive gas within the cylinder 14, the pressure level thereof may be brought to approximately atmospheric. With identical pressure both within and without the cylinder 14, the windows 18 may be extremely thin thus minimizing any absorbing action they may have on the transmitted beam 20. The higher pressure enhances speed of response by improving convective heat transfer to the sensing devices. Beam power loss is thus minimized.

Additionally, the blackbody effect described offers low gas heat loss and the temperature rise in the absorbing gas from the beam 20 will be maintained within the cylinder 14, thus the detectors 16 provide a true and sensitive reflection of the beam power actually absorbed. Minor losses via windows 18, 18, will have little effect on the accuracy of the readings.

While the preferred embodiment of the invention suggests a combination of absorbing and non-absorbing gas within the cylinder 14, it will be understood by those technically expert in this field that as noted earlier in certain circumstances a single gas may be used which is weakly absorbent of the beam being transmitted in the particular spectral level. The existence and use of such a single gas, however, will not usually occur and, while operative, tends to limit the flexibility of the invention. When a mixture of absorbing and non-absorbing gases are used, the designer will be able to accurately determine the percentage of beam energy he would desire to use for monitoring purposes depending upon the accuracy required or the power level in the specific service application and thus effectively control the total beam power being transmitted to accomplish useful work.

It will also be noted that while the invention has been described as typically monitoring a single gas, laser-type, high-power level, continuously-radiated beam, it could also be utilized in monitoring a plurality of beams of different wavelengths to continuously obtain a reading of total delivered power. It would only be necessary to choose an appropriate mixture of absorbing gases for deposit within the cylinder 14, each of which would be effective to absorb one or more of the wavelengths of the particular beams being propagated. Conceivably, one gas, in certain applications, could absorb energy from beams of several different wave-lengths. A further requirement would be selecting material for windows 18 able to transmit all wavelengths of interest.

The invention as described particularly refers to radiation in the 10.6 micron wavelength. It will, however, be apparent to those skilled in the art, that, by using other gases, radiation of different wavelengths may be monitored, e.g., at 7.8 micron radiation nitrous oxide may be used ($N_2O$).

When it is desired to calibrate an absorption radiometer of the type described, it is merely necessary to provide a total energy absorber as disclosed in FIG. 4. This structure is typical of the prior art devices used to measure beam energy level. It may comprise a solid block housing 40 having a conical cavity 42 at its front aspect. The cavity surface 44 will be coated with an appropriate energy-absorbing material, such as graphite, and the radiant beam 46 will be focused on the cavity. Internally of the block 40 a plurality of channels 48, 48, are provided and series connected to an input tube 50 and exhaust tube 52. Water or other liquid is circulated through the channels 58 and the input and exhaust tubes 50 and 52. The in-temperature of such water is conventionally measured and compared with the out-temperature of the same water at tube 52. The rise in water temperature per given volume of water circulated per unit of time gives an accurate indication of the radiation power absorbed and hence the total power level of the beam 46. With this information, the beam may then (or simultaneously) be passed through the absorption radiometer of FIG. 1 and the indication of beam energy level therefrom calibrated with the total energy level determined by the structure of FIG. 4.

The invention as disclosed is a typical preferred embodiment and may be modified in many equivalent particulars all within the spirit and scope of the invention.

What is claimed is:

1. In a device to monitor the power being delivered by a beam of continuous radiation,
   the combination of a closed chamber,
   beam-transparent elements forming part of the chamber walls to accommodate passage of the beam through the chamber,
   fluid means in the chamber and filling the chamber,
   said fluid means having the capacity to absorb energy from the beam in the range of the spectral band of the beam,
   and means to monitor changes in the temperature level of the fluid means.

2. A device to monitor the power being delivered by a beam of continuous radiation according to claim 1,
   wherein the fluid means within the chamber is a gas and is weakly absorbent of the beam energy in said range.

3. A device to monitor the power being delivered by a beam of continuous radiation according to claim 2,
   wherein said transparent elements are positioned at approximately the Brewster angle with respect to the axis of the beam.

4. A device to monitor the power being delivered by a beam of continuous radiation according to claim 2,
   wherein said gas in said chamber comprises a mixture of a first gas and a second gas,
   one of said gases having the capacity to absorb energy from the beam in the range of the spectral band of the beam,
   and the other of said gases being transparent at the beam and accommodating beam passage therethrough without energy absorption therefrom.

5. A device to monitor the power being delivered by a beam of continuous radiation according to claim 2,
   wherein the pressure within the chamber is approximately equivalent to the pressure externally thereof.

6. In a device to monitor the power being delivered by a beam of continuous radiation,
   the combination of an elongated closed chamber,
   beam-transparent elements at opposed ends of the chamber and positioned at approximately the Brewster angle with respect to the axis of propagation of the beam,
   the transverse dimension of said chamber being greater than the transverse dimension of said beam,
   gas means within and filling the chamber weakly absorbent of beam energy at approximately the spectral band of the beam whereby a portion of said beam energy is dissipated to the gas to increase the temperature thereof,
   and monitoring means to sense changes in temperature level of the gas.

7. A device to monitor the power being delivered by a beam of continuous radiation according to claim 6,
   wherein the pressure level within the closed chamber is approximately equal to the pressure level externally thereof,
   said monitoring means being positioned within the chamber and outside of the physical dimensions of the propagated beam.

8. A device to monitor the power being delivered by a beam of continuous radiation according to claim 7,
   wherein the gas within the chamber comprises a mixture of gases,
   certain of said gases having the capacity to absorb energy from the beam in the spectral band of the beam and other of said gases being transparent to the beam and accommodating beam passage therethrough without energy absorption thereof,
   the energy-absorbing gas being a small percentage by volume of the total gas within the chamber.

9. A device to monitor the power being delivered by a beam of continuous radiation according to claim 8, wherein said radiation beam is from a laser.

References Cited

UNITED STATES PATENTS

| | | |
|---|---|---|
| 2,451,724 | 10/1948 | Evans. |
| 2,471,744 | 5/1949 | Hershberger _____ 324—95 XR |
| 3,212,002 | 10/1965 | Weibel _____ 324—95 |

OTHER REFERENCES

Application Abstract of H. R. Meahl No. 706,894 published September 1950.

JAMES J. GILL, Primary Examiner

U.S. Cl. X.R.

324—95